United States Patent
Cillis et al.

(10) Patent No.: US 10,229,039 B2
(45) Date of Patent: Mar. 12, 2019

(54) TESTING A VIRTUAL NETWORK FUNCTION BY A VIRTUAL NETWORK TESTER

(71) Applicants: International Business Machines Corporation, Armonk, NY (US); ng4T GmbH, Berlin (DE)

(72) Inventors: Canio Cillis, Berlin (DE); Jochen Kappel, Berlin (DE); Martin McDonald, Berlin (DE); Christian van Maastricht, Amsterdam (NL)

(73) Assignees: International Business Machines Corporation, Armonk, NY (US); NG4T GMBH, Berlin (DE)

( * ) Notice: Subject to any disclaimer, the term of this patent is extended or adjusted under 35 U.S.C. 154(b) by 99 days.

(21) Appl. No.: 15/335,606

(22) Filed: Oct. 27, 2016

(65) Prior Publication Data
US 2018/0121335 A1 May 3, 2018

(51) Int. Cl.
*G06F 11/36* (2006.01)

(52) U.S. Cl.
CPC ...... *G06F 11/3684* (2013.01); *G06F 11/3688* (2013.01); *G06F 11/3692* (2013.01)

(58) Field of Classification Search
CPC .............. G06F 11/0709; G06F 11/0793; G06F 11/2023; H04L 43/0876; H04L 43/50; H04L 43/00; H04L 43/16
See application file for complete search history.

(56) References Cited

U.S. PATENT DOCUMENTS

| | | | |
|---|---|---|---|
| 9,794,160 B1 * | 10/2017 | Felstaine | H04L 43/50 |
| 9,912,573 B1 * | 3/2018 | Zemlerub | H04L 43/50 |
| 2015/0234725 A1 * | 8/2015 | Cillis | G06F 11/263 714/33 |
| 2017/0295084 A1 * | 10/2017 | Ramanath | H04L 43/50 |
| 2017/0317914 A1 * | 11/2017 | Yoon | H04L 41/0806 |

FOREIGN PATENT DOCUMENTS

CN  104410672  3/2015

OTHER PUBLICATIONS

Network Functions Virtualisation (NFV); Pre-Deployment Testing; Report on Validation of NFV Environments and Services, Source: ETSI GS NFV-TST001 V0.0.11 (Aug. 2015),Retrieved from Internet: URL:https://www.google.co.in/url?sa=t&rct=j&q=&esrc=s&source=web&cd=3&cad=rja&uact=8&ved=0ahUKEwiYnbDqpvnLAhVEKKYKHX5gBbUQFggpMAI&url=https%3A%2F%2Fdocbox.etsi.org%2FISG%2FNFV%2FOpen%2FDrafts%2FTST001_-_Predeployment_, 48 pages.

(Continued)

*Primary Examiner* — Nadeem Iqbal
(74) *Attorney, Agent, or Firm* — Schmeiser, Olsen & Watts, LLP; David Woycechowsky

(57) ABSTRACT

A method and associated system for testing a virtual network function by a virtual network tester, wherein a predefined certification context specification specifies services based on the virtual network function in form of different usage patterns, and wherein a predefined test case selection matrix specifies applicable test cases for each usage pattern. In response to selecting a usage pattern from the different sage patterns, the applicable test cases are determined from the test case selection matrix and control parameters of the test case selection matrix based on the selected usage pattern.

18 Claims, 11 Drawing Sheets

(56) References Cited

OTHER PUBLICATIONS

NFV Performance Testing, Benchmarking and Monitoring Solution to Validate Performance of VNFS, Service Chaining and End-To-End Performance, Performance testing and monitoring in NFV, Retrieved from Internet Jun. 1. 2016 URL: http://www.veryxtech.com/products/solutions/nfv-network-functionvirtualization/performance-testing-and-monitoring, 4 pages.

Enabling and Testing Network Functions Virtualization (NFV) to Ensure Carrier-Grade Delivery, Retrieved from Internet: URL: https://www.ixiacom.com/sites/default/files/resources/whitepaper/testing-networkfunctions-virtualization-whitepaper.pdf, 915-0945-01 Rev. A. Apr. 2014, 22 pages.

* cited by examiner

| Certification Context vEPC | Usage Pattern | Usage Pattern Parameters | | Tests | Load | Bearer | Result Evaluation |
|---|---|---|---|---|---|---|---|
| a) vEPC Infrastructure | Vmware<br>KVM<br>KVM power | CPU<br>MEM | | Installation tests<br>Installation tests<br>Installation tests | No<br>No<br>No | No<br>No<br>No | Automated installation |
| b) vEPC Package | Onboard<br>LCM | Mgmt<br>Configuration<br>External I/Fs | | operations | No<br>No | No<br>No | operability |
| c) vEPC Baseline | Attach/detach<br>Activate/deactivate<br>Relocate<br>paging | Duration<br>Duration<br>Load<br>load | | Ciphering<br>QoS<br>Handover, data transfer<br>flooding | X | X | Standards KPI<br>Standards KPI<br>Standards KPI<br>Own metrics |
| d) vEPC Service | Lte data<br>Lte data mobility<br>Lte data dedicated bearer | Cores | data processing units | Basic signaling tests<br>Mobility tests<br>Dedicated bearer tests | Cores * dpe * load factor | Default<br>Default | Limits: load, packet loss, packet delay<br>Limits:... |
| | TCP based services<br>Real time gaming<br>Video streaming<br>Gaming, voice, video | Load<br>Load<br>Load<br>Load | Types<br>Types<br>Types<br>Types | Web, email, ftp, chat<br>Game traffic<br>Traffic | Non-GBR QCI6/8/9<br>GBR QCI3<br>Non-GBR QCI7 | Default2<br>Dedicated<br>Dedicated | Limits:...<br>Limits:...<br>Limits:...<br>Limits:... |
| | VoLTE signaling<br>VoLTE voice<br>VoLTE video<br>M2M vending machines<br>M2M car | CPS<br>Voice traffic %<br>Video traffic %<br>M2M traffic<br>Car control traffic | Call length | SIP<br>NB, WB<br>Video<br>Many Ues, low packet rates<br>Real time data | Non-GBR QCI5<br>GBR QCI1<br>GBR QCI2<br>Non-GBR QCI6/8/9 | Default<br>Default | |
| e) vEPC Network | | | | | | | |
| f) vEPC OSS/BSS | | | | | | | |
| g) vEPC Performance | | | | | | | |

Fig. 2

| Usage Pattern | Attach/ Detach | Acticate/ Deactivate | Activate 2nd Deactivate | Relocate | Path Switch | Update Area | Activate Idle | Paging | Modify QoS | VoLTE Call |
|---|---|---|---|---|---|---|---|---|---|---|
| LTE data | X | X | | | | | | | X | |
| LTE data mobility | X | X | | X | X | X | X | X | X | |
| LTE data bearer | X | X | X | X | X | X | X | X | X | |
| TCP based services | X | X | X | X | X | X | X | X | X | |
| Real time gaming | X | X | | | | | | | | |
| Video streaming | X | X | | | | | | | | |
| Gaming, voice, video | X | X | | | | | | | | |
| VoLTE signaling | X | X | X | X | X | X | X | X | X | X |
| VoLTE voice | X | X | X | X | X | X | X | X | X | X |
| VoLTE video | X | X | X | X | X | X | X | X | X | X |
| M2M vending machines | X | X | | | | | | X | | |
| M2M car | TC 3,4,5 Metric ATT/DTCH | TC 6,8,10 Metric ACT/DACT | | | TC 5,8,59 Metric Relocation | TC 3,7,9 Metric Switching | TC 4,6,7 Metric TAU | TC 4,6,8 Metric Active/Idle | TC 7 Metric Paging | TC 5 Metric VoLTE |

Fig. 3

| Test Suite / Usage Pattern | Web/http | Streaming video | Smartphone apps | Email | Automotive data | Vending data | Social media | AMR NB | AMR WB | IMS video |
|---|---|---|---|---|---|---|---|---|---|---|
| Lte data | X | X | X | X | | | | | | |
| Lte data mobility | X | X | X | X | | | | | | |
| Lte data bearer | X | X | X | X | | | | | | |
| TCP based services | X | X | X | X | | | | | | |
| Real time gaming | X | X | | | | | | | | |
| Video streaming | | X | | | | | | | | |
| Gaming, voice, video | X | X | X | | | | | | | |
| VoLTE signaling | | | | | | | | X | | |
| VoLTE voice | | | | | | | | X | X | |
| VoLTE video | | | | | | | | X | X | X |
| M2M vending machines | | | | | | X | | | | |
| M2M car | | | | | TC 56.76 Metric AutData | | | TC 1.45 Metric AMR NB | | |

Fig. 4

| Attach/Detach | Activate/Deactivate | Activate 2nd Deactivate | Relocate | Path Switch | Update Area | Activate Idle | Paging | Modify QoS | VoLTE Call |
|---|---|---|---|---|---|---|---|---|---|
| TC 3,4,5 | TC 6,8,10 | | | TC 5,8,59 | TC 3,7,9 | TC 4,6,7 | TC 4,6,8 | TC 7 | TC 5 |

Fig. 5

| Test Suite | Attach/Detach | Acticate/Deactivate |
|---|---|---|
| | ************* S1cu_079, S1cu_093 ********** | ************* S1cu_097, S1cu_084 ********** |

60 → (header row)
62 → (data row)

Fig. 6

| Test Suite / Usage pattern | Attach/ Detach | Acticate/ Deactivate | Activate 2nd Deactivate | Relocate | Path Switch | Update Area | Activate Idle | Paging | Modify QoS | VoLTE Call |
|---|---|---|---|---|---|---|---|---|---|---|
|  | TC 3,4,5 | TC 6,8,10 |  |  | TC 5,8,59 | TC 3,7,9 | TC 4,6,7 | TC 4,6,8 | TC 7 | TC 5 |

| Test Suite / Usage pattern | Attach/ Detach | Acticate/ Deactivate | Activate 2nd Deactivate | Relocate | Path Switch | Update Area | Activate Idle | Paging | Modify QoS | VoLTE Call |
|---|---|---|---|---|---|---|---|---|---|---|
| M2M car metrics | Metric ATT/DTCH H=Retransmission 0,01% Failure 100 ppm | Metric ATT/DACT T=Retransmission 0,001% Failure 10 ppm |  | Metric Relocation =Retransmission 0,002% Failure 20 ppm | Metric PathSwitching H=Retrans mission 0,002% Failure 20 ppm | Metric H=Retrans mission 0,002% Failure 20 ppm | Metric H=Retrans mission 0,002% Failure 20 ppm | Metric H=Retrans mission 0,002% Failure 20 ppm | Metric H=Retrans mission 0,002% Failure 20 ppm | Metric H=Retrans mission 0,002% Failure 20 ppm |

Fig. 8

TESTING A VIRTUAL NETWORK FUNCTION BY A VIRTUAL NETWORK TESTER

TECHNICAL FIELD

The present invention relates to testing a virtual network function by a virtual network tester.

BACKGROUND

Testing schemes for physical network functions use dedicated testers to test appliances, which is expensive and time consuming. Moreover, these methods are unreliable as predictors for performance of virtualized network functions (VNFs) deployed on a Network Function Virtualization infrastructure (NFVI) due to constantly changing network conditions.

One of the inhibitors of virtual network function testing are the current methods of test case selection for pre-deployment and deployment testing. Since context of VNFs and network services (NSs) for testing vary, so do the applicable test cases. The certification context depends on a variety of factors.

For testing the VNFs, various users need to have a detailed understanding of the System Under Test (SUT) and the relevant test scenarios. For pre-deployment testing, the details of the VNFs have to be understood in order to be able to do acceptance testing, black box testing, performance testing, etc. For deployment testing, the details of the environment, in which the VNF is deployed, have to be understood. Moreover, VNFs in operation can be implemented on different NFVIs, so that the different instances of VNFs may require different test cases.

Since VNFs need to be deployed and replaced automatically, the testing of VNFs needs to be done in an automated way. Not knowing what test cases to perform exactly will lead to running all test cases, in order to be sure, rather than running only the relevant test cases.

The certification context is a set of metadata to drive the selection test cases and generation of test lists for a specific test demand within a predefined scenario (e.g., baseline certification, live network testing, service replacement and the like).

The certification context describes that part of a business process that should be tested. The certification context has many input artifacts and is a result of the integration planning or service design phase.

Currently, there are seven areas of certification identified. These seven areas cover all aspect of the certification context. The areas and the associated sources to generate a certification context are:

a) Infrastructure: HEAT Template to describe the infrastructure model of the VNF, (HEAT is the Openstack orchestration service; i.e., an open source infrastructure resource orchestration engine)

b) Package: VNF Package to describe the deployment and configuration model, c) Baseline: Model for baseline testing (initial certification and conformance), d) Service: Model for service layer certification, e) Network: Model to describe the transport Internet Protocol (IP) core model of the connectivity, f) Operational Support Systems/Business Support Systems (OSS/BSS): Model for OSS and Billing testing, g) Performance: Model for performance benchmarking.

Note that the preceding list of areas and the associated sources a)-g) to generate a certification context are only examples for current key technologies in this area.

SUMMARY

Embodiments of the present invention include a method, and associated computer program product and computer system, for testing a virtual network function by a virtual network tester, wherein a predefined certification context specification specifies services based on the virtual network function in form of different usage patterns, and wherein a predefined test case selection matrix specifies applicable test cases for each usage pattern. In response to selecting a usage pattern from the different usage patterns, one or more processors of a computer system determine the applicable test cases from the test case selection matrix and control parameters of the test case selection matrix based on the selected usage pattern According to an aspect of the present invention, there is a method, computer program product and/or system that performs the following operations (not necessarily in the following order): (i) receiving certification context specification data including information mapping a sets of test conditions to respectively corresponding usage patterns of a plurality of usage patterns; (ii) receiving testcase selection matrix data including information identifying, for each usage pattern of the plurality of usage patterns, a respectively corresponding set of test case(s); (iii) receiving test condition data indicative of an applicable set of test conditions for testing of a virtual network function; (iv) selecting an applicable usage pattern based upon the applicable set of test conditions and the mapping of the certification context specification data; (v) selecting a set of applicable test case(s) based upon the applicable usage pattern and the testcase selection matrix; and (vi) testing, by a virtual network tester, the virtual network function using the set of applicable test case(s).

Some embodiments of the present invention may include one, or more, of the following features, characteristics and/or advantages: (i) selecting a set of control parameter value(s) based on the applicable usage pattern: (ii) the testing of the virtual network function uses the set of control parameter value(s); (iii) the sets of test conditions of the certification context specification data each include Network Scenarios (NF) related conditions; and/or (iv) the sets of test conditions of the certification context specification data each include Virtual Function Network Infrastructure (VNFI) related conditions.

BRIEF DESCRIPTION OF THE DRAWINGS

The present invention together with the above-mentioned and other objects and advantages may best be understood from the following detailed description of the embodiments, but not restricted to the embodiments.

FIG. 2 shows a certification context specification for an example of virtual evolved packet core (vEPC) instance testing, according to embodiments of the present invention.

FIG. 3 depicts a test case selection matrix concerning the signaling aspect, according to embodiments of the present invention.

FIG. 4 depicts a test case selection matrix, concerning the data aspect, according to embodiments of the present invention.

FIG. 5 lists a row of a test case selection matrix comprising a list of test cases, according to embodiments of the present invention.

FIG. 6 depicts cells of a test case selection matrix with test case IDs for different test suites, according to embodiments of the present invention.

FIG. 8 depicts a part of a test case selection matrix comprising usage patterns, referenced to metrics, according to embodiments of the present invention.

DETAILED DESCRIPTION

Figure 1:
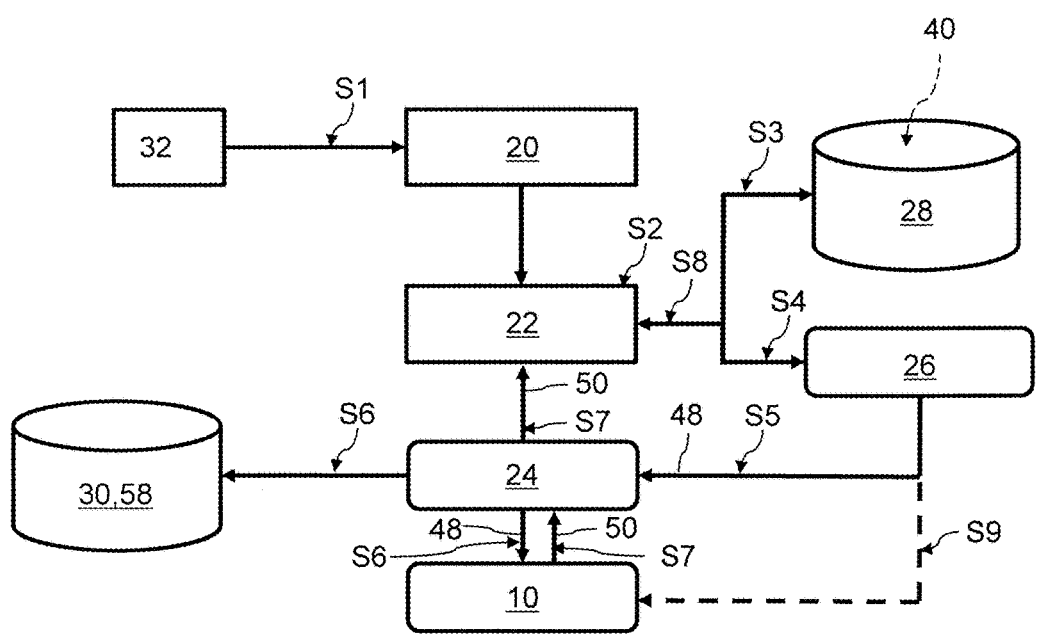
FIG. 1 depicts a reference architecture for testing a virtual network function by a virtual network tester, according to embodiments of the present invention.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

The illustrative embodiments described herein provide a method, system, and computer program product for testing a virtual network function by a virtual network tester. The illustrative embodiments are sometimes described herein using particular technologies only as an example for the clarity of the description. The illustrative embodiments may be used for testing a virtual network function by a virtual network tester, with a predefined certification context specification specifying services based on the virtual network function in form of different usage patterns, and with a predefined test case selection matrix specifying applicable test cases for each usage pattern, comprising: in response to selecting a usage pattern, the applicable test cases from the test case selection matrix and their control parameters are determined based on the selected usage pattern.

Advantageously, according to the inventive method, the virtual network tester translates a user input vector to a test list test vector via a translation matrix, wherein the user input vector may comprise information such as a business use case, a Service Under Test (SUT), a test verification context, a usage pattern, usage pattern parameters, and/or generic input parameters. The test vector to be generated may cover test cases; test case combinations; sequential, merged, parallel, test case parameters; a tester configuration; and/or result verification formulas. The input parameters may be defined in translation formulas and may be populated back to the input vector.

Test verification steps may be identified in a context of the process. Automated execution and verification of the test results may be initiated in the context of the process.

Descriptive user input parameters for the process based certification framework may be captured through a graphical user interface (GUI) or a text based user interface or the like from the user. These user input parameters may be translated into a user input vector for testing.

The first parameter to be selected is a business process or use case (UC); e.g. UC-1: Lifecycle Management, UC-2: Replacement, UC-3: Maintenance, and the like. With this business process parameter, the certification context is selected. Next the parameters for each of the relevant segments of the certification context are selected: (i) infrastructure, package, baseline: for a pre-deployment related business process; (ii) service network, OSS/BSS, performance for a deployment related business process.

For each business process a certification context is maintained.

A test case selection matrix per certification context may be defined and maintained as well as linked to all other artefacts such as test suites, test cases, test planning, etc.

A metadata mapping may be stored and maintained, using tagging, between vendor specific test cases and standard test cases (Documentation or standardized test cases).

Finally, connectivity of the virtual network function may be switched, based on test metric result, from the test environment to a live network.

Advantageously a live network testing may be performed by the virtual network tester.

Figure 9:
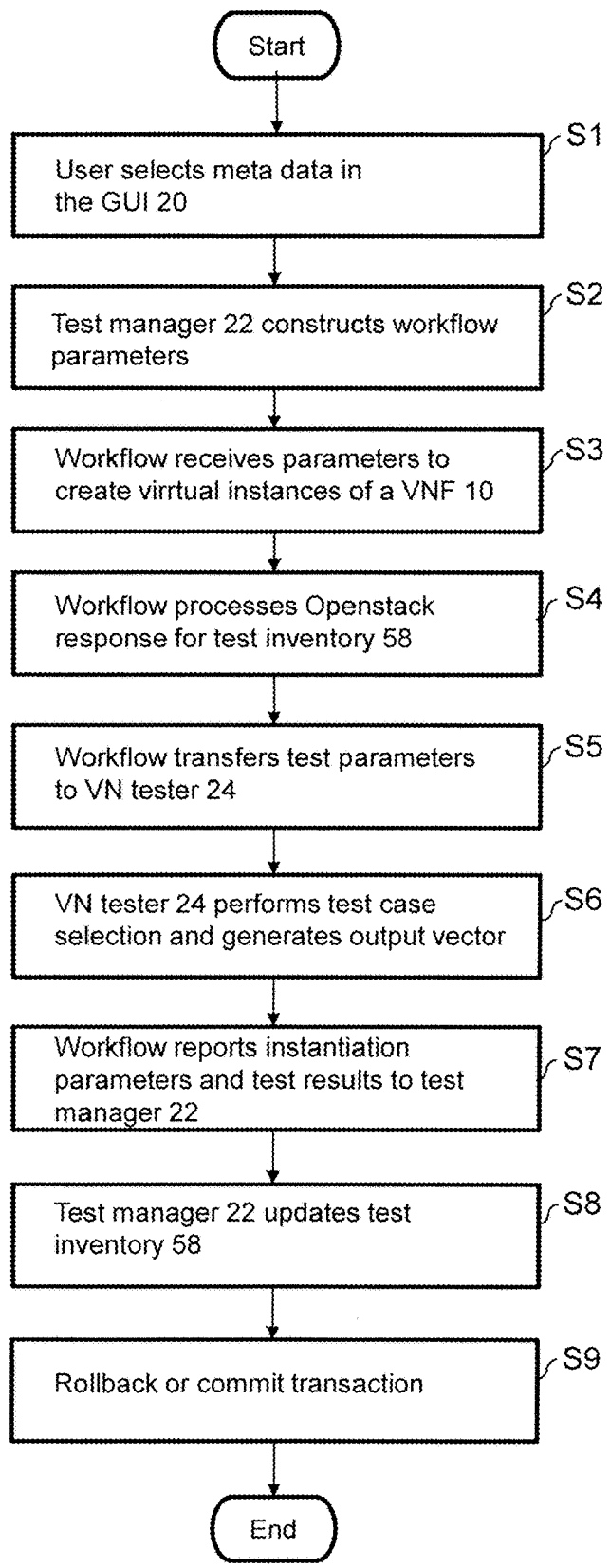
FIG. 9 depicts a flow chart of a generic process for testing a virtual network function by a virtual network tester, according to embodiments of the present invention.

FIG. 1 depicts a reference architecture for testing a virtual network function 10 by a virtual network tester 24, according to embodiments of the present invention. In FIG. 2, a certification context specification 40 is shown. In FIGS. 3 to 8, different aspects of a test case selection matrix 40 are depicted. FIG. 9 depicts a flow chart of a generic process for testing a virtual network function by a virtual network tester, according to an embodiment of the present invention. In FIG. 9, different steps of the method flow are shown in relation to the signal flow indicated in FIG. 1.

According to the inventive method of the present invention, metadata of the virtual network function 10 are selected based on the certification context specification 40 by the user 32 via a graphical user interface 20. The metadata may also be selected via a text based interface or the like. Selecting the metadata of the virtual network function 10 comprises at least one of the following: specifying a use case 52; specifying a certification context specification 40; and specifying control parameters 46. The certification context specification 40 comprises applicable test conditions depending on network scenarios and a virtual network function infrastructure.

A usage pattern 42 is derived from the metadata using the certification context specification 40, and is stored in the catalog 28. The Catalog 28 holds the VNF design artefacts, the certification contexts, the Test cases and the Testcase selection matrix. Deriving a usage pattern 42 from the metadata further comprises specifying usage pattern parameters 54.

The test manager 22 controls the process by communicating to the catalog 28 and a virtual infrastructure manager 26. The virtual network tester 24 determines applicable test cases 44 from the test case selection matrix 40 and their control parameters 46 based on the selected usage pattern 42. Alternatively, the test cases 44 may also be determined by the test manager 22 or by an intermediate process. Determining the applicable test cases 44 from the test case selection matrix 40 and their control parameters 46 comprises constructing workflow parameters for creating virtual instances of the virtual network function 10 for the virtual network tester 24 and for creating a test run of the virtual network tester 24 and/or assigning network resources.

A test vector 48 is generated based on the test cases 44 and applied to the virtual network function 10. Creating the test vector 48 based on the test cases 44 comprises selecting at least one test case 44 from a test suite 56 of the test case selection matrix 40.

Thus applying the test vector 48 to the virtual network function 10 further comprises at least one of the following: performing a test case selection using the test case selection matrix 40; transforming usage pattern parameters 54 to test case parameters; transforming control parameters 46 to test case parameters; and generating the test vector 48.

The virtual network function 10 may be controlled by the virtual infrastructure manager 26.

The virtual network tester 24 is reporting test results 50 back to the test manager 22, which updates a test inventory 58, stored together with the test case selection matrix 40. The virtual network tester 24 reporting test results 50 to the test manager 22 comprises reporting instantiation parameters and/or updating a test inventory 58 by creating a test run instance and storing the test results 50. A metrics 66 may be used for evaluating the test results 50 based on test cases 44, and/or test execution parameters 64. Depending on the test results 50, a rollback or a commit action for the virtual network function 10 is performed.

As an embodiment of the present invention, the inventive method may be applied to a situation of deploying a new virtual evolved packet core (vEPC) instance for an automotive use case (for example, "connected car")

For the service area certification context, the vEPC may be selected as the virtual function under test, the 'Service' segment may be selected as one of seven certification areas and the subsequent Service Type=M2M-car, where M2M stands for machine to machine). Upon this selection, more user input may be required, wherein the user input may be: Service Type specific parameters (call type=emergency, etc.), and test execution relevant parameters (load level, etc.).

Using the business process certification framework the test manager 22 will create a test vector 48 enabling performing the test case selection, transforming sub profile and test execution parameters 64 to test case parameters 44, creating test list instances and starting the test run.

The system may perform the test case mapping and selection, which may optionally, depending on the test management layer, transform usage patterns 42 and the generic test execution parameters 64 to test cases 44 and create test list instances to start the test run.

Typical test run results 50 for the vEPC are: passed/failed test case, packet loss, delay, jitter, signalling and retransmissions.

As one example for applying the inventive method, the vEPC is described as a virtual network function 10. For the certification context specification 40, one example is provided, namely the certification context service level testing.

FIG. 2 shows the certification context specification 40 for the example of the vEPC instance testing, according to embodiments of the present invention. In the rows of the table depicted in FIG. 2, example information for seven instances of the vEPC are listed. The name of the respective instance is listed in the first column. The second column lists the usage patterns 42 to be chosen for the different instances and the third and fourth columns list the respective usage pattern parameters 54. In the fifth column, possible tests 45 are listed followed in the sixth column by the respective possible loads 68. Further, bearers 70 are listed in the seventh column, followed finally by information/hints about a result evaluation 72 of the testing process in the eighth column.

For applying the inventive method to service level testing of the vEPC, the respective usage patterns 42 for the vEPC service instance may be found in FIG. 2 in row d) vEPC service.

As an example, several user scenarios may be applicable for testing the vEPC service:

User scenario 1: The technical marketing team wants to deploy a new vEPC instance automotive.

User scenario 2: The service designer wants to pre-test a vEPC instance for a dedicated automotive customer in a pre-production environment before the vEPC instance is rolled out in the live network.

User scenario 3: The operations team wants to upgrade a specific type of vEPC in operations.

User scenario 4: A service designer defines a vEPC Service for M2M-car targeted to automotive industry.

Each user scenario may be mapped to a separate use case (UC).

The system architecture in FIG. 1 as well as the corresponding summarizing flowchart in FIG. 9 illustrate the testing of a virtual network function 10, using a use case or process based certification framework. The process itself will be described as follows, based on the example of vEPC service level testing.

Referring to step S1 in FIG. 9, in the graphical user interface 20 (GUI), the user 32 selects the following metadata:

a) use case and SUT and vendor (process=UC1, vendor=vEPC from vendor x) to indicate what is the purpose and the main subject of the certification;

b) certification context 40 (certification context CC) and usage pattern 42 (CC=vEPC, usage pattern=M2M-car); 'Certification area' selection. If 'vEPC Service' is selected, the usage pattern 42 needs to be added;

c) usage pattern parameters 54 (call type=emergency . . . ). if a specific usage pattern 42 has been selected, additional parameters may need to be specified (for instance, with the usage pattern 42 of 'M2M vending machines' no call type=emergency need to be tested, (default), whereas with M2M Automotive the call type=emergency is mandatory);

d) test execution parameters 64 (load level=medium, test type=preproduction, test level quick check).

These test parameters describe the test case performance level needed in this user scenario; e.g., load level=low may be mapped to 50 subscribers, load level=medium to 5000 subscribers and load level=high to 5,000,000 subscribers.

For the service area certification, the parameters available on the GUI 20 could be:

Usage patterns 42=<lte_data/lte data mobility/lte data bearer/TCP based services/Real time gaming/Video streaming/Gaming, voice, video/VoLTE signaling/VoLTE voice/VoLTE video/M2M-vending machines/M2M-car->.

Usage pattern parameters 54=<call type>(optional)/normal, IMSI, Combined-CS, Combined, Emergency>.

Test execution parameters 64=<load level>: low; medium; high; <test level>: quick check, standard, detailed.

VoLTE stands for Voice over LIE, and LTE stands for the mobile phone standard LTE.

Referring to step S2 in FIG. 9, using the UC or process certification framework, the test manager 22 constructs for the selected business process (for example UC1) the following workflow parameters:

To create the vEPC and virtual network tester 24 instance with an AttributeValueList=HEAT template name, HEAT template parameter for vEPC and the virtual network tester 24.

(HEAT templates and HEAT API are artefacts of an Open-source tool such as Openstack to create virtual instances of a function).

To assign compute, storage end networking resources to create an instance of the system under test, the main parameters (resource identification) may be delivered from a cloud environment in collaboration with Open Source tools such as Openstack.

To create the test run of the virtual network tester 24 with the usage pattern parameter 54 and test execution parameter 54. Further, the GUI parameters from the step S1 are processed.

Referring to step S3 in FIG. 9, the workflow for UC1 receives the above workflow parameters and retrieves the HEAT template and calls a HEAT API.

Referring to step S4 in FIG. 9, the workflow for the process UC1 performs an Openstack API (API stands for application programming interface) call and processes the Openstack response and retrieves other create instantiation parameters if needed for the test inventory 58. In the test inventory 58, all task and execution relevant parameters for the test evaluation and final reporting are stored.

Referring to step S5 in FIG. 9, the workflow for the process UC1 transfers the virtual network tester test run parameters (i.e., the test vector 48) to start the test.

Considering the specific implementation for the test case selection matrix 40 in FIGS. 3 and 4, the matching cell will deliver automatically the additional information to be passed to the test execution (the test vector 48). For the example of vEPC service level testing, the additional information may look like:

tc_X_Y.ntl<service type><Test execution parameter><Service Type parameter>, where Y=test suite selection; X=s for signaling, refers to signaling the signaling test suites and d for data, refers for data testing test suites 56.

An example for a test suite specification may be (see test case selection matrix 40 in FIG. 4; a test from each test suite 56 needs to be selected):

Case X=s;
Y=atdt/acdc/ac2dc/reloc/ps/updta/actidle/paging/modqos/voltecall;
Case X=d;
Y=Weht/Stvi/Smap/Email/Autda Vendda/SoMe/AM-RNB/AMRWB/IMS Video.

Referring to step S6 in FIG. 9, the virtual network tester 24 performs the final test case selection (using the test case selection matrix 40), transforms the usage pattern parameters 54 to test case parameters, transforms the test execution parameters 64 to test case parameters and generates the run time version of the stock list (=test vector 48). Further, the virtual network tester 24 performs the traffic selection, transforms profile specific parameters to traffic selectors, reports result limits and metrics (e.g. loss, delay, and jitter) relevant to pass the test.

Referring to step S7 in FIG. 9, the workflow for the process UC1 reports back to the test manager 22 instantiation parameters and later the test run results.

Referring to step S8 in FIG. 9, using the process certification framework, the test manager updates the test inventory 58 by creating a test run instance and stores test results from the test run.

Referring to step S9 in FIG. 9, depending on the test results, the process certification framework calls the commit part of the business process workflow of UC1: rollback or commit the transaction, which may be user controlled.

FIGS. 3 and 4 depict a test case selection matrix 40, according to an embodiments of the present invention. A vEPC service is an example. In FIG. 3 the signaling aspect is depicted, whereas in FIG. 4 the data aspect is depicted.

In FIG. 3, the rows of the table list the possible usage patterns 42, whereas the columns list corresponding test case groups 60, summarizing different test cases 44. A combination of a usage pattern 42 and a test case group 60 is relevant, if the corresponding cell contains an 'X'.

In FIG. 4, the rows of the table list the possible usage patterns 42, whereas the columns list corresponding test suites 56. A combination of a usage pattern 42 and a test suite 56 is relevant, if the corresponding cell contains an 'X'.

Each cell in the test case selection matrices 40 in FIGS. 3 and 4 thus is a structured information element and consists of a list of test cases 44, parameters, and the corresponding metrics 66.

FIG. 5 lists a row of a test case selection matrix 40 comprising a list of test cases 44, according to embodiments of the present invention. Each cell may contain references to relevant test cases 44 (predefined and approved from a test management authority).

For user equipment (UE) testing on an air interface (Uu) between the LIE and a base station or to test an IP related function (virtual routers, Firewalls), the test cases 44 could reference to standardized test cases or RFCs. For the vEPC such a structure is not available. Uu is the 3GPP air interface reference point between the UE and an evolved node B (eNB)

Implementation of a generic design for all test cases 44 may be useful, to reference all test cases 44 to a standards specification document; and to tag all test cases 44 with additional tags such as: i) System (LTE, UMTS . . . ), ii) Test suite (Attach/Detach, . . . ).

FIG. 6 depicts cells of a test case selection matrix 40 with test case IDs 62 for different test suites 60, according to embodiments of the present invention.

Figure 7:
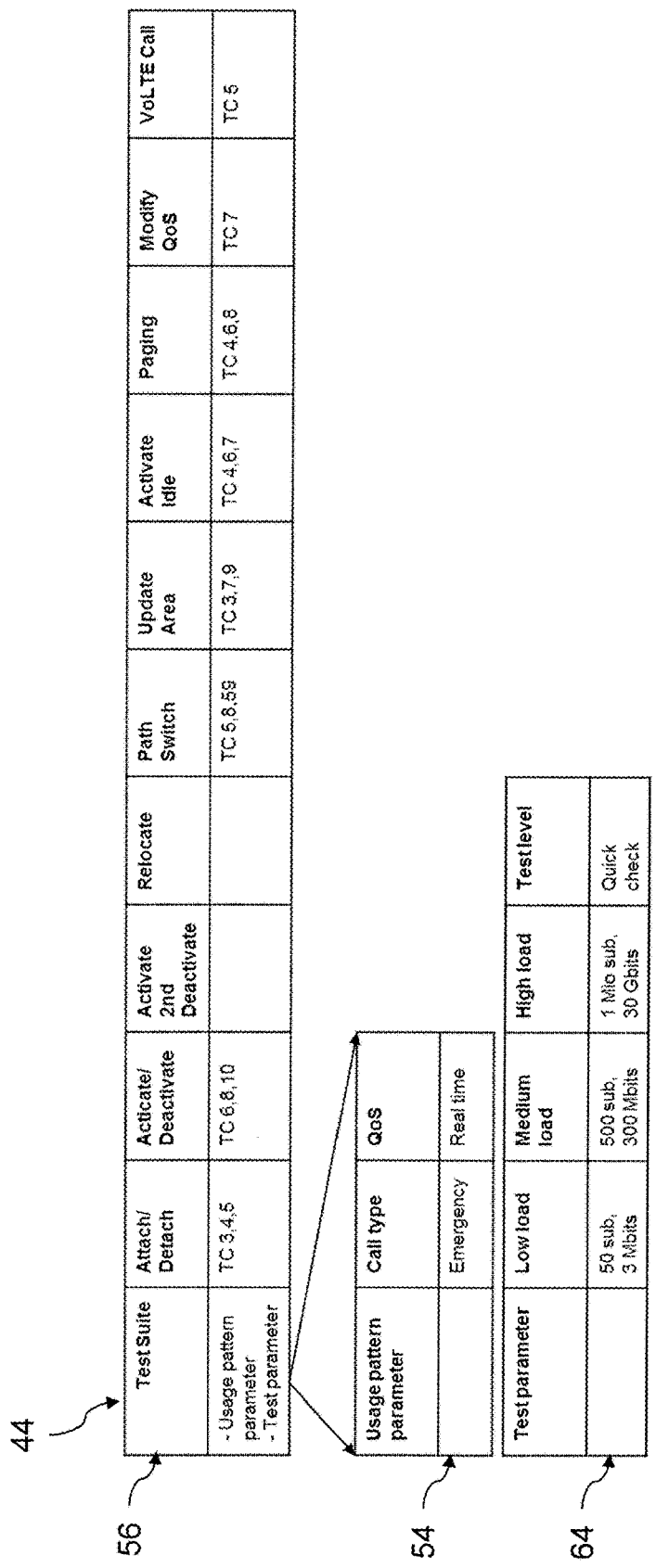
FIG. 7 shows a part of a test case selection matrix comprising usage patterns, referenced to usage pattern parameters and test parameters, according to embodiments of the present invention.

FIG. 7 shows a part of a test case selection matrix 40 comprising usage patterns 42, referenced to usage pattern parameters 54 and test execution parameters 64, according to embodiments of the present invention. Each usage pattern parameter 42 and test execution parameter 54 will be passed to the selected test cases 44 per test suite 60 and applied if possible (e.g., emergency call within a paging test case has no effect).

FIG. 8 depicts a part of a test case selection matrix 40 comprising usage patterns 42, referenced to metrics 66, according to embodiments of the present invention. Metrics 66 are predefined for each test suite column and will be monitored and reported. Metrics 66 can be an expression of the test case selection and the subprofile parameters and the test execution parameters 54.

An example of an operational business process may be as a first use case UC1: a vEPC certification for commissioning into a live network. From the vEPC certification context and the M2M-car usage pattern selection, the certification test cases are derived and the test lists are instantiated upon user input parameters (load level . . . ). The test environment is generated on demand (RAN emulation, eNB-ID . . . ). The certification test list is executed after vEPC deployment in an isolated environment (Sandbox or pre-production). Only upon test success, the vEPC external interfaces may be switched to the operational network elements (HSS, RAN., where HSS stands for home subscriber server and RAN stands for radio access network).

The following test automation steps may be to deploy a virtual test driver and connect to vEPC external interfaces: for vEPC for M2M-car, to select, instantiate generate and execute certification tests; on success, to switch vEPC external interfaces to network interfaces.

A further example of an operational business process may be as a second use case UC2: replacing an operational virtual mobility management extension (vMME) to a new version. An operational vMME is replaced with a new vMME version during live operation. All subscribers will be redirected to the new vMME.

Test automation steps may be implemented to deploy a new vMME including test driver and connect new vMME external interfaces; similarly to select a vEPC sub profile: select, instantiate and execute certification tests; when successful to switch subscribers hosted from the old vMME to the new vMME.

FIG. 9 summarizes in a flow chart a process for testing a virtual network function 10 by a virtual network tester 24, according to embodiments of the present invention. In step S1, metadata of the virtual network function 10 may be selected by a user 32 based on the certification context specification 40 via a graphical user interface 20. In step S2, the test manager 22 may construct workflow parameters for creating virtual instances of the virtual network function 10 for the virtual network tester 24 and for creating a test run of the virtual network tester 24 and/or assigning network resources. Next in step S3, the workflow may receive the workflow parameters for creating virtual instances of the virtual network function 10, followed by step S4, where the workflow may process network responses for the test inventory 58. In step S5, the workflow may transfer test execution parameters 64 to the virtual network tester 24 and in step S6, the virtual network tester 24 may perform the test case selection and may report test results 50 to the test manager 22. In step S7, the workflow may report instantiation parameters and, after completing the test, test results 50 to the test manager 22. In step S8, the test manager 22 may update the test inventory 58 and, depending on the test results 50, may perform a rollback or a commit action for the virtual network function 10 in step S9.

Figure 10:
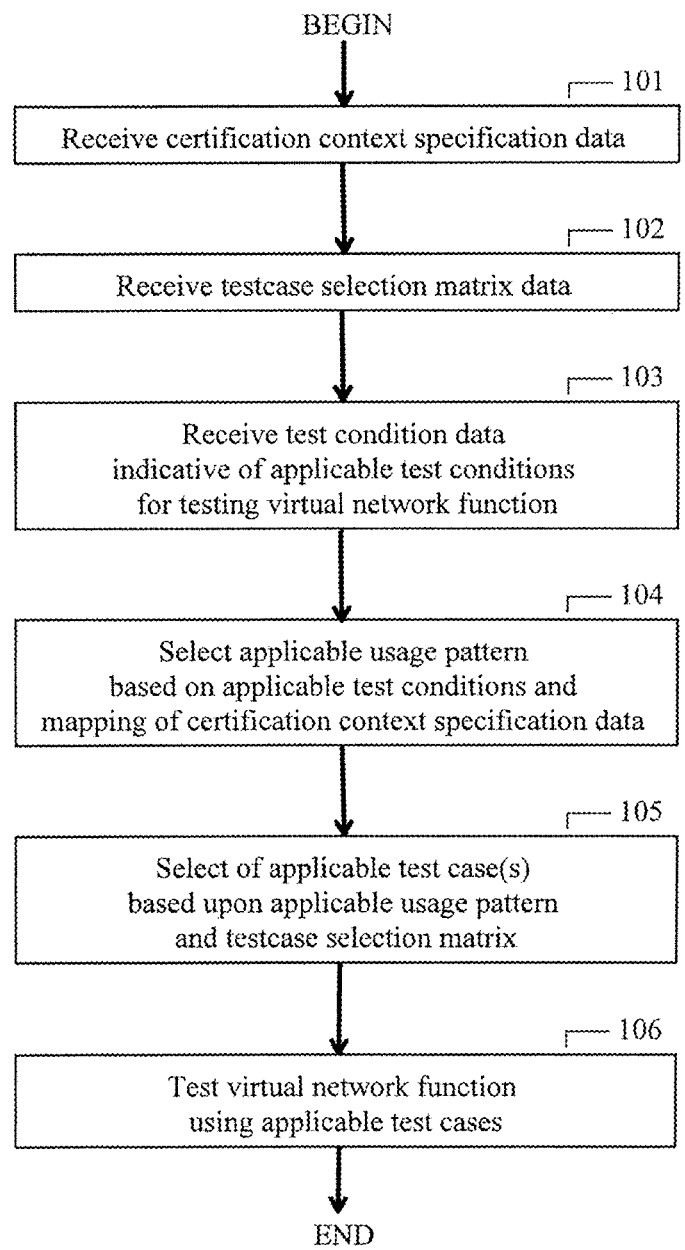
FIG. 10 is a flow chart of a method, according to embodiments of the present invention.

FIG. 10 is a flow chart of a method, according to embodiments of the present invention. The flow chart of FIG. 10 includes steps 101-106.

Step 101 receiving certiesation context specification data including information mapping a sets of test conditions to respectively corresponding usage patterns of a plurality of usage patterns.

Step 102 receives testcase selection matrix data including information identifying, for each usage pattern of the plurality of usage patterns, a respectively corresponding set of test case(s).

Step 103 receives test condition data indicative of an applicable set of test conditions for testing of a virtual network function.

Step 104 selects an applicable usage pattern based upon the applicable set of test conditions and the mapping of the certification context specification data.

Step 105 selects a set of applicable test case(s) based upon the applicable usage pattern and the testcase selection matrix.

Step 106 tests, by a virtual network tester, the virtual network function using the set of applicable test case(s).

Figure 11:
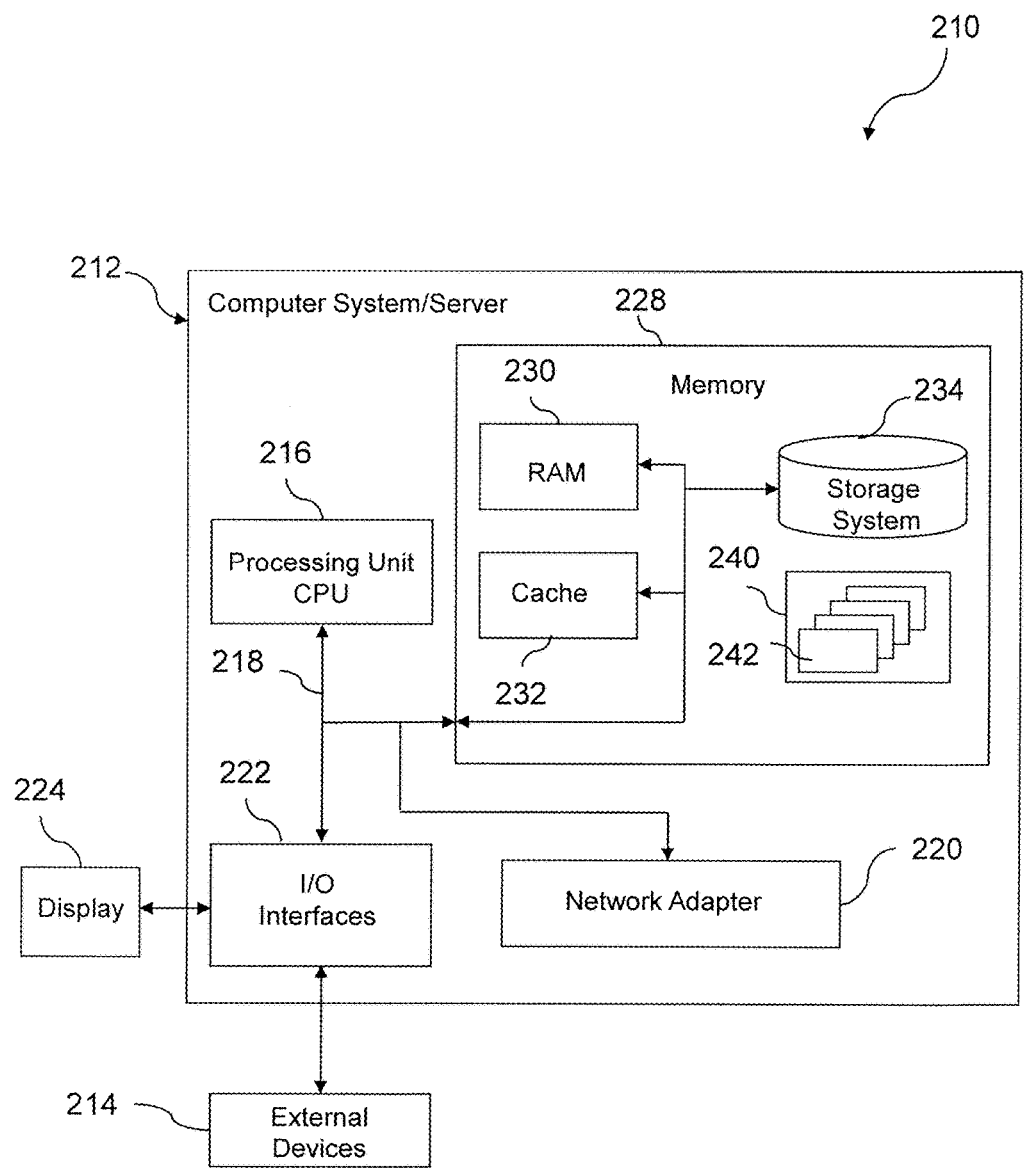
FIG. 11 shows an example embodiment of a data processing system for implementing methods of the present invention.

FIG. 11 shows an example embodiment of a data processing system 210 for implementing methods of the present invention. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210, there is a computer system/server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an Operating System, one or more application programs, other program modules, and program data. Each of the Operating System, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

Some embodiments of the present invention may include one, or more, of the following features, characteristics, operations and/or advantages: (i) method for testing a Virtual Network Function (VNF) by a VNF tester; (ii) a predefined Certification Context Specification specifies the applicable test conditions such as Network Scenarios (NF) and Virtual Function Network Infrastructure (VNFI) in form of different usage patterns; (iii) a predefined Testcase Selection Matrix specifies the applicable test cases for each usage pattern; and/or (iv) in response to the selection of a usage pattern, determining the applicable test cases from said Testcase Selection Matrix and their control parameters based on the selected usage pattern.

Some definitions will be set forth in the following paragraphs:

And/or: inclusive or; for example, A, B "and/or" C means that at least one of A or B or C is true and applicable.

Including/include/includes: unless otherwise explicitly noted, "including but not necessarily limited to."

Machine logic: any manufacture and/or machine including computer software, computer hardware and/or computer firmware.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, said method comprising:
   receiving first data including information mapping sets of test conditions to respectively corresponding usage patterns of a plurality of usage patterns;
   receiving testcase selection matrix data including information identifying, for each usage pattern of the plurality of usage patterns, a respectively corresponding set of test cases;
   receiving test condition data indicative of an applicable set of test conditions for testing of a virtual network function;
   selecting an applicable usage pattern based upon the applicable set of test conditions and the mapping of the first data;
   selecting a set of applicable test cases based upon the applicable usage pattern and the testcase selection matrix;
   testing, by a virtual network tester, the virtual network function using the set of applicable test cases; and
   depending on test results from the testing, performing a rollback or commit action for the virtual network function.

2. The method of claim 1, said method further comprising:
   selecting a set of control parameter values based on the applicable usage pattern;
   wherein the testing of the virtual network function uses the set of control parameter values.

3. The method of claim 1, wherein the sets of test conditions of the first data each include Network Scenarios (NF) related conditions.

4. The method of claim 1, wherein the sets of test conditions of the first data each include Virtual Function Network Infrastructure (VNFI) related conditions.

5. A computer program product, comprising:
   a machine readable storage device; and
   computer code stored on the machine readable storage device, with the computer code including instructions for causing one or more processors to perform a method, said method comprising:
      receiving first data including information mapping sets of test conditions to respectively corresponding usage patterns of a plurality of usage patterns;
      receiving testcase selection matrix data including information identifying, for each usage pattern of the plurality of usage patterns, a respectively corresponding set of test cases;
      receiving test condition data indicative of an applicable set of test conditions for testing of a virtual network function;

selecting an applicable usage pattern based upon the applicable set of test conditions and the mapping of the first data;

selecting a set of applicable test cases based upon the applicable usage pattern and the testcase selection matrix;

testing, by a virtual network tester, the virtual network function using the set of applicable test cases; and depending on test results from the testing, performing a rollback or commit action for the virtual network function.

6. The computer program product of claim 5, said method further comprising:

selecting a set of control parameter value(s) based on the applicable usage pattern;

wherein the testing of the virtual network function uses the set of control parameter values.

7. The computer program product of claim 5, wherein the sets of test conditions of the first data each include Network Scenarios (NF) related conditions.

8. The computer program product of claim 5, wherein the sets of test conditions of the first data each include Virtual Function Network Infrastructure (VNFI) related conditions.

9. A computer system, comprising:

one or more processors;

a machine readable storage device; and computer code stored on the machine readable storage device, with the computer code including instructions for causing the one or more processors to perform a method, said method comprising:

receiving first data including information mapping sets of test conditions to respectively corresponding usage patterns of a plurality of usage patterns;

receiving testcase selection matrix data including information identifying, for each usage pattern of the plurality of usage patterns, a respectively corresponding set of test cases;

receiving test condition data indicative of an applicable set of test conditions for testing of a virtual network function;

selecting an applicable usage pattern based upon the applicable set of test conditions and the mapping of the first data;

selecting a set of applicable test cases based upon the applicable usage pattern and the testcase selection matrix;

testing, by a virtual network tester, the virtual network function using the set of applicable test cases; and depending on test results from the testing, performing a rollback or commit action for the virtual network function.

10. The computer system of claim 9, said method further comprising:

selecting a set of control parameter value(s) based on the applicable usage pattern;

wherein the testing of the virtual network function uses the set of control parameter value.

11. The computer system of claim 9, wherein the sets of test conditions of the first data each include Network Scenarios (NF) related conditions.

12. The computer system of claim 9, wherein the sets of test conditions of the first data each include Virtual Function Network Infrastructure (VNFI) related conditions.

13. The method of claim 1, wherein the test results pertain to packet loss, delay, jitter, or combinations thereof.

14. The computer program product of claim 5, wherein the test results pertain to packet loss, delay, jitter, or combinations thereof.

15. The computer system of claim 9, wherein the test results pertain to packet loss, delay, jitter, or combinations thereof.

16. The method of claim 1, wherein the test results pertain to signaling and retransmissions.

17. The computer program product of claim 5, wherein the test results pertain to signaling and retransmissions.

18. The computer system of claim 9, wherein the test results pertain to signaling and retransmissions.

* * * * *